United States Patent
Harer

(10) Patent No.: US 6,681,885 B2
(45) Date of Patent: Jan. 27, 2004

(54) RACK AND PINION STEERING GEAR WITH POWDERED METAL BUSHING

(75) Inventor: Dennis F. Harer, Kingsport, TN (US)

(73) Assignee: TRW Inc., Lyndhurst, OH (US)

( * ) Notice: Subject to any disclaimer, the term of this patent is extended or adjusted under 35 U.S.C. 154(b) by 63 days.

(21) Appl. No.: 09/956,406

(22) Filed: Sep. 19, 2001

(65) Prior Publication Data

US 2003/0052468 A1 Mar. 20, 2003

(51) Int. Cl.⁷ .............................................. B62D 5/22
(52) U.S. Cl. ...................... 180/427; 180/417; 277/353; 277/585
(58) Field of Search ................ 180/417, 427, 180/428; 280/93.514, 93.515; 277/352, 353, 358, 367, 369, 376, 406, 925, 928, 572, 579, 585, 940, 941, 942; 384/119, 120, 123, 125, 130, 124, 143, 147, 151, 901, 903, 910, 912, 913

(56) References Cited

U.S. PATENT DOCUMENTS

| | | | |
|---|---|---|---|
| 4,129,309 A | * 12/1978 | Kohnert et al. | 277/456 |
| 4,481,866 A | * 11/1984 | Matouka | 91/375 A |
| 4,742,883 A | 5/1988 | Duffy | |
| 4,759,420 A | 7/1988 | Schipper, Jr. et al. | |
| 4,781,024 A | * 11/1988 | Nakamura | 60/533 |
| 4,996,905 A | * 3/1991 | Borror | 74/388 PS |
| 5,213,174 A | * 5/1993 | Adams | 180/427 |
| 5,655,621 A | 8/1997 | Birsching | |
| 5,851,014 A | * 12/1998 | Germann et al. | 277/406 |
| 6,004,039 A | * 12/1999 | Yabe et al. | 384/463 |
| 6,089,683 A | * 7/2000 | Anderton et al. | 305/103 |

OTHER PUBLICATIONS

"Road and Track Illustrated Automotive Dictionary", Bentley Publishers, 2000.*

* cited by examiner

Primary Examiner—Anne Marie Boehler
(74) Attorney, Agent, or Firm—Tarolli, Sundheim, Covell & Tummino L.L.P.

(57) ABSTRACT

A rack and pinion steering apparatus (10) comprises a housing (12). Helical teeth (60) of a pinion gear (54) meshingly engage teeth of a rack bar (42) and, during rotation of the pinion gear (54), result in an axial force. A shaft (86) connects with the pinion gear (54). Rotation of the shaft (86) effects rotation of the pinion gear (54). An assembly is interposed between the shaft (86) and the housing (12). The assembly comprises a first snap ring (142) that is attached to the shaft (86) and a second snap ring (144) that is attached to the housing (12). Interposed between the first and second snap rings (142 and 144) are only a fluid tight seal (146) for blocking fluid leakage from the housing (12) and a bushing (108) for enabling rotation of the shaft (86) relative to the housing (12) and for engaging the first snap ring (142) to block axial displacement of the pinion gear (54) due to the axial force acting on the pinion gear (54).

8 Claims, 3 Drawing Sheets

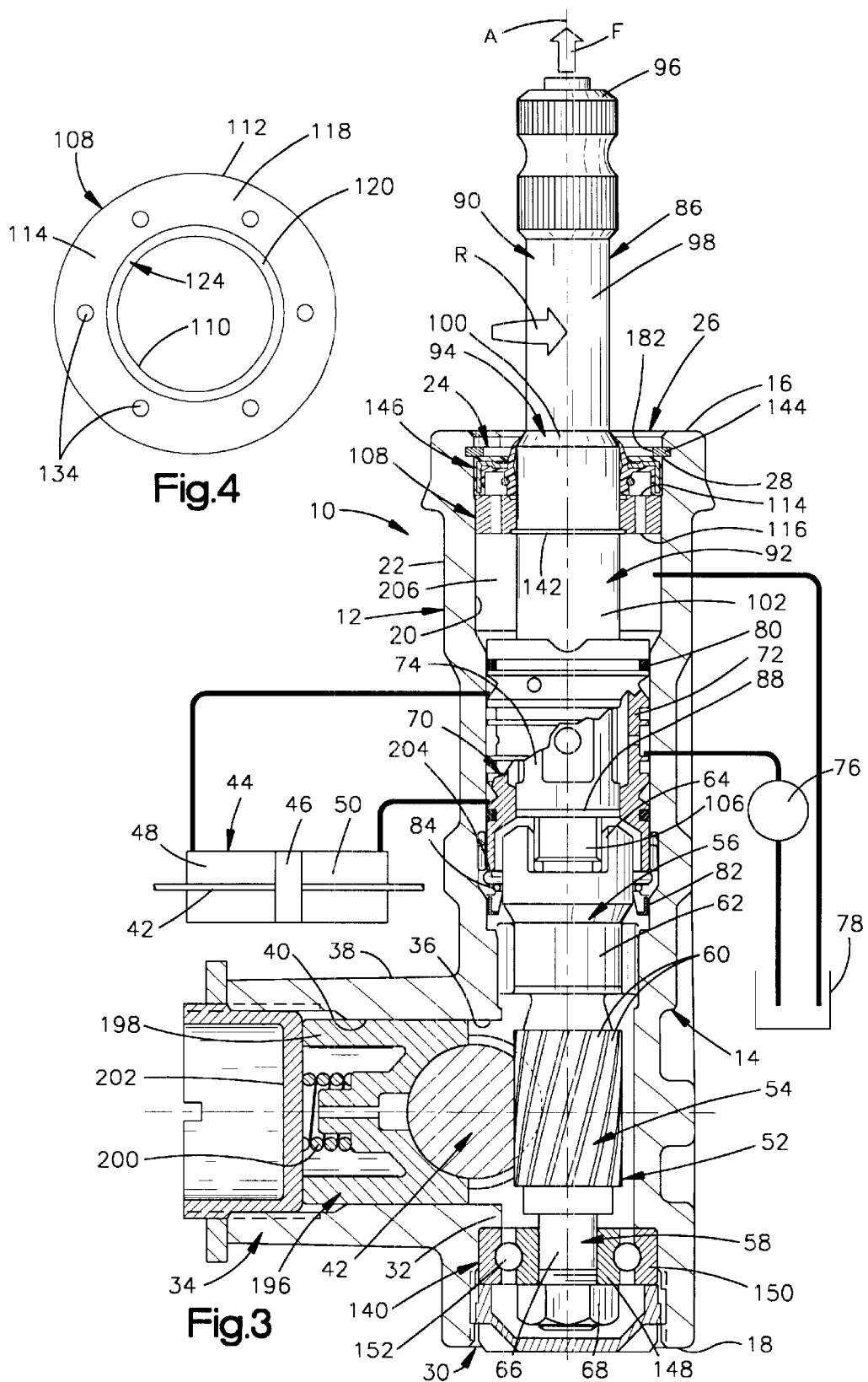

RACK AND PINION STEERING GEAR WITH POWDERED METAL BUSHING

TECHNICAL FIELD

The present invention relates to a rack and pinion steering gear. More particularly, the present invention relates to a rack and pinion steering gear with a pinion gear having helical teeth.

BACKGROUND OF THE INVENTION

A known rack and pinion steering gear includes a housing. A rack bar extends longitudinally through the housing and has opposite ends that are connectable with the steerable wheels of the vehicle. A portion of the rack bar extending through the housing includes teeth. As the rack bar is moved linearly relative to the housing, the steerable wheels of the vehicle are turned.

The known rack and pinion steering gear also includes a pinion gear. The pinion gear includes a plurality of helical teeth. The pinion gear is located within the housing so that the helical teeth of the pinion gear are in meshing engagement with the teeth of the rack bar. The pinion gear is rotatable relative to the housing.

An input shaft extends partially into the housing. A first end of the input shaft is connectable with the steering wheel of the vehicle. A second end of the input shaft is connected with the pinion gear, generally through a torsion bar.

A roller bearing is interposed between the housing and the input shaft. The roller bearing enables rotation of the input shaft relative to the housing. Rotation of the input shaft effects rotation of the pinion gear by either directly rotating the pinion gear or by actuating a power assist motor which moves the rack bar and thus causes rotation of the pinion gear.

Rotation of the pinion gear results in a force that is directed along an axis of the input shaft. A pinion nut resists movement of the pinion gear that may result from the axial force. However, if the pinion nut loosens, the axial force may move the pinion gear axially relative to the rack bar and detrimentally affect the meshing engagement of the rack bar and pinion gear.

To prevent disengagement of the pinion gear with the rack bar in the event of a loose pinion nut, the known rack and pinion steering gear includes a retaining ring and a capture washer. The retaining ring is seated in a groove in the input shaft and is thus axially fixed to the input shaft. The capture washer is located adjacent the roller bearing and is interposed between the roller bearing and the retaining ring. When an axial force is applied to the input shaft, the input shaft moves axially until the retaining ring contacts the capture washer. The capture washer blocks further axial movement and thus, blocks further axial displacement of the pinion gear.

SUMMARY OF THE INVENTION

The present invention is a rack and pinion steering apparatus for turning steerable wheels of a vehicle in response to rotation of a steering wheel. The apparatus comprises a housing. A rack bar extends through the housing and is movable relative to the housing for turning the steerable wheels of the vehicle. The rack bar has a plurality of teeth. A pinion gear is located within the housing and is rotatable relative to the housing. The pinion gear includes a plurality of helical teeth that meshingly engage teeth of the rack bar. Engagement of the helical teeth of the pinion gear with the teeth of the rack bar during rotation of the pinion gear in a first direction results in an axial force acting on the pinion gear. A shaft is connectable with the steering wheel of the vehicle and is rotatable relative to the housing. At least a portion of the shaft extends into the housing and connects with the pinion gear. Rotation of the shaft effects rotation of the pinion gear. An assembly is interposed between the shaft and the housing. The assembly includes a first snap ring that is attached to the portion of the shaft that extends into the housing. A second snap ring is attached to the housing. Interposed between the first and second snap rings are only a fluid tight seal for blocking fluid leakage from the housing and a bushing for enabling rotation of the shaft relative to the housing. The bushing includes a radially extending surface for engaging the first snap ring to block axial displacement of the pinion gear due to the axial force acting on the pinion gear.

BRIEF DESCRIPTION OF THE DRAWINGS

The foregoing and other features of the present invention will become apparent to those skilled in the art to which the present invention relates upon reading the following description with reference to the accompanying drawings, in which:

FIG. 3 is a sectional elevation view of the rack and pinion steering gear of FIG. 1 showing a first snap ring contacting a powdered metal bushing; and FIG. 4 is a plan view of the powdered metal bushing for the rack and pinion steering gear of FIG. 1.

DETAILED DESCRIPTION OF THE INVENTION

The figures that are referred to hereinafter illustrate a rack and pinion steering gear 10 having a pinion nut 68 that has loosened. Although the loosening of a pinion nut of a rack and pinion steering gear is a rare occurrence, the rack and pinion steering gear 10 constructed in accordance with the present invention includes provisions for maintaining the integrity of the steering gear should the pinion nut loosen.

Figure 1:
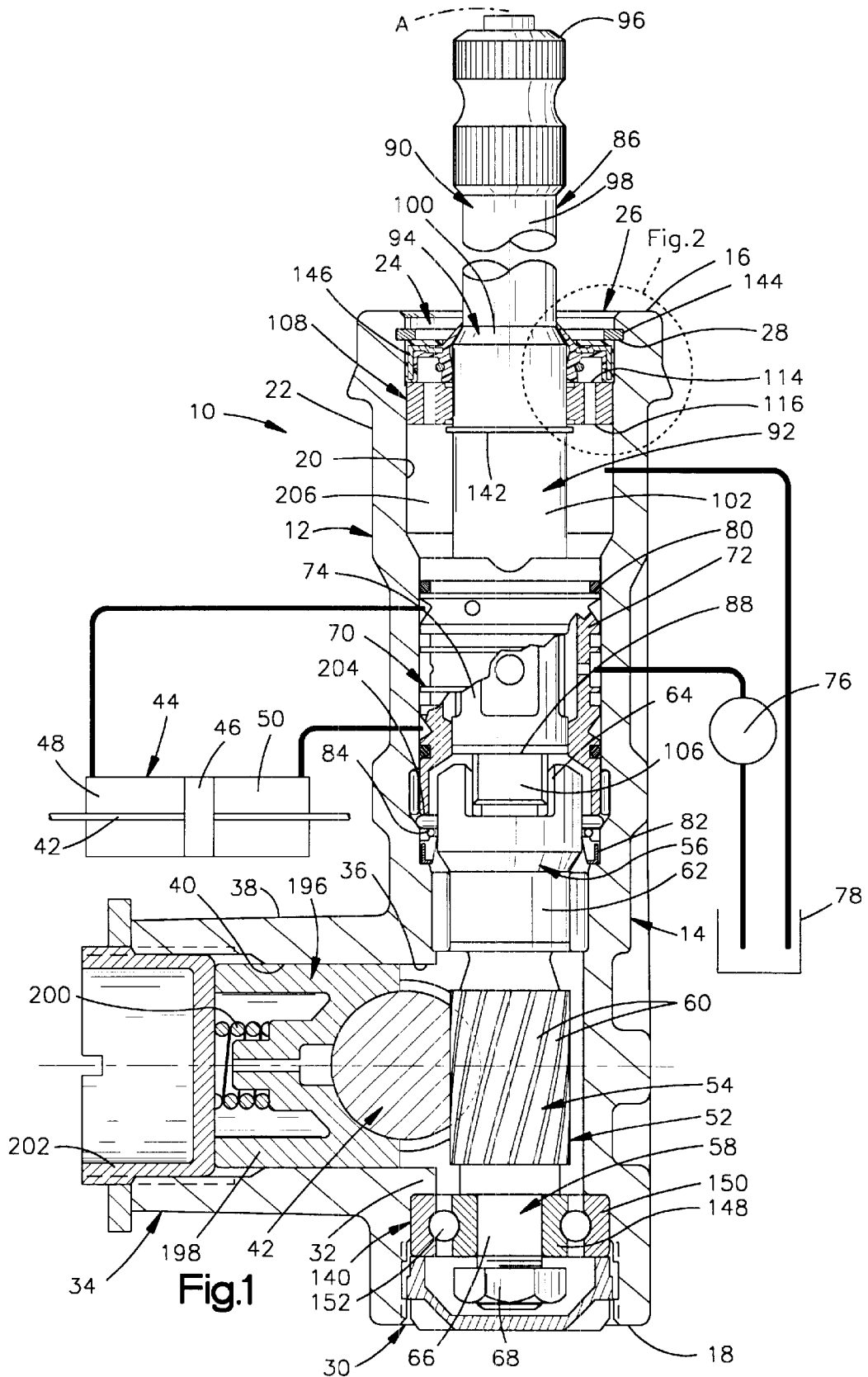
FIG. 1 is a sectional elevation view of a rack and pinion steering gear constructed in accordance with the present invention and showing a first snap ring axially spaced from a powdered metal bushing.

FIG. 1 is a sectional elevation view of a rack and pinion steering gear 10 constructed in accordance with the present invention. The rack and pinion steering gear 10 of FIG. 1 is a hydraulic power-assisted rack and pinion steering gear.

The rack and pinion steering gear 10 includes a housing 12. The housing 12 includes a first tubular portion 14 that extends axially along axis A. The first tubular portion 14 of the housing 12 has first and second axial ends 16 and 18, respectively, and cylindrical inner and outer surfaces 20 and 22, respectively. The inner surface 20 of the first tubular portion 14 of the housing 12 defines a passage 24 that extends axially through the first tubular portion 14.

A first opening 26 of the passage 24 is located on the first axial end 16 of the first tubular portion 14 and is defined by the inner surface 20 of the first tubular portion 14 adjacent the first axial end 16. A groove 28 extends into the inner surface 20 of the first tubular portion 14 of the housing 12 adjacent the first axial end 16 of the housing 12. The groove 28 extends around the entire circumference of the inner surface 20 of the first tubular portion 14 of the housing 12.

A second opening 30 of the passage 24 is located at the second axial end 18 of the first tubular portion 14 of the housing 12. The second opening 30 is defined by the inner surface 20 of the first tubular portion 14 adjacent the second axial end 18. A radially inwardly extending, annular wall 32 extends from the inner surface 20 of the first tubular portion 14 near the second axial end 18.

The housing 12 also includes a second tubular portion 34. The second tubular portion 34 of the housing 12 extends perpendicular to the first tubular portion 14 and unites with the first tubular portion near the second axial end 18 of the first tubular portion. The second tubular portion 34 has inner and outer surfaces 36 and 38, respectively. The inner surface 36 defines a yoke bore 40. The yoke bore 40 of the second tubular portion 34 mates with the passage 24 of the first tubular portion 14 near the second axial end 18 of the first tubular portion.

A longitudinally extending rack bar 42 extends through the housing 12 in a direction perpendicular to axis A. The rack bar 42 has a generally circular cross-sectional shape. The rack bar 42 includes a plurality of helical teeth. Opposite end portions (not shown) of the rack bar 42 are connected with the steerable wheels (not shown) of the vehicle (not shown). Linear movement of the rack bar 42 results in the turning of the steerable wheels of the vehicle.

A hydraulic motor 44, shown schematically in FIGS. 1 and 3, is also formed in the housing 12. The hydraulic motor 44 includes a piston 46, which is attached to the rack bar 42, and two chambers 48 and 50, one on each side of the piston. As hydraulic fluid pressure in one chamber 48 or 50 increases relative to the hydraulic fluid pressure in the other chamber 50 or 48, the piston 46 is moved. Movement of the piston 46 causes linear movement of the rack bar 42.

The rack and pinion steering gear 10 also includes a pinion assembly 52. The pinion assembly 52 includes a pinion gear 54, a first support portion 56, and a second support portion 58. The pinion gear 54 has a plurality of helical teeth 60 for meshingly engaging the teeth of the rack bar 42.

The first support portion 56 of the pinion assembly 52 forms the first axial end of the pinion assembly. The first support portion 56 includes a cylindrical outer surface 62. An axially extending cavity 64 extends into an end of the first support portion 56. A hole (not shown) extends radially through the first support portion 56 adjacent the cavity 64.

The second support portion 58 of the pinion assembly 52 forms a second axial end of the pinion assembly. The second support portion 58 has a cylindrical outer surface 66. An axial end of the cylindrical outer surface 66 of the first support portion 58 is threaded for receiving a pinion nut 68.

The rack and pinion steering gear 10 also includes a directional control valve, shown generally at 70. The directional control valve 70 includes a valve sleeve 72 and a valve core 74. The directional control valve 70 is controlled by rotation of the steering wheel to direct hydraulic fluid to one of the chambers 48 or 50 of the hydraulic motor 44. The hydraulic fluid is supplied to the directional control valve 70 by a pump 76 that draws fluid from a reservoir 78.

The valve sleeve design is known in the art and will not be discussed in detail. The valve sleeve 72 is generally tubular and includes first and second axial ends 80 and 82, respectively. A hole 84 extends radially through second axial end 82 of the valve sleeve 72.

The valve core 74 is also of known design and will not be discussed in detail. The valve core 74 forms a second axial end 88 of an input shaft 86. The input shaft 86 also includes first and second cylindrical portions 90 and 92, respectively and a tapered portion 94 that is interposed between the first and second cylindrical portions. The first cylindrical portion 90 forms a first axial end 96 of the input shaft 86. The first cylindrical portion 90 includes a generally cylindrical outer surface 98. The tapered portion 94 of the input shaft 86 has a frustoconical outer surface 100. The first cylindrical portion 90 of the input shaft 86 connects to a narrow end of the tapered portion 94. The second cylindrical portion 92 of the input shaft 86 extends between a wide end of the tapered portion 94 and the valve core 74. The second cylindrical portion 92 includes a generally cylindrical outer surface 102. A groove 104 (FIG. 2) extends radially inwardly into the cylindrical outer surface 102 of the second cylindrical portion 92 of the input shaft 86. The groove 104 extends circumferentially around the second cylindrical portion 92.

The rack and pinion steering gear 10 also includes a torsion bar 106. Only a small portion of the torsion bar 106 is shown in FIG. 1. The torsion bar 106 includes first and second axial ends (not shown). The second axial end is splined. The first axial end of the torsion bar 106 is rotatable relative to the second axial end of the torsion bar which causes the torsion bar to twist.

Figure 2:
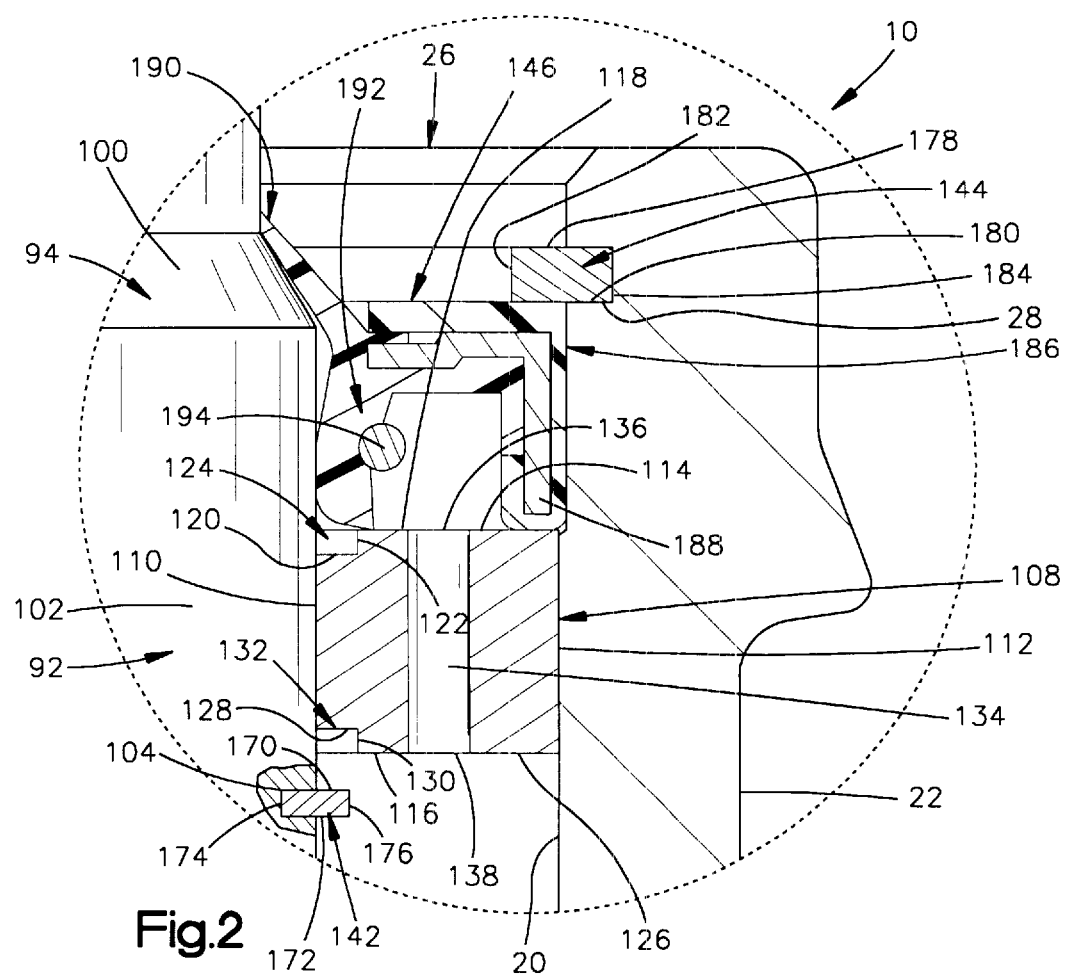
FIG. 2 is an enlarged view of the section of FIG. 1 labeled FIG. 2.

FIG. 4 shows a plan view of a powdered metal bushing 108 of the rack and pinion steering gear 10. A partial cross-section of the powdered metal bushing 108 is shown in FIG. 2. The powdered metal bushing 108 is self-lubricating and is formed of a combination of iron, copper, and carbon. The percentage of iron in the powdered metal bushing ranges from 91.1% to 95.4%. The percentage of copper in the powdered metal bushing 108 ranges from 4.0% to 8.0% and the percentage of carbon ranges from 0.6% to 0.9%. The powdered metal bushing may also include small amounts of other materials, such as magnesium sulfite. The powdered metal bushing 108 is formed by pressing, or compressing, powdered metal in a die having the appropriate shape.

The powdered metal bushing 108 is annular and includes radial inner and outer surfaces 110 and 112, respectively, as shown in FIG. 2. The inner surface 110 defines the inner diameter of the powdered metal bushing 108. The inner diameter is slightly larger than the diameter of the second cylindrical portion 92 of the input shaft 86. The outer surface 112 of the powdered metal bushing 108 defines the outer diameter of the powdered metal bushing and is coaxial with the inner surface 110. The outer diameter is slightly larger than an inner diameter of the housing 12.

The powdered metal bushing 108 also includes upper and lower surfaces 114 and 116, respectively. The upper surface 114 includes first and second radially extending surfaces 118 and 120, respectively, and an axially extending surface 122. The first and second radially extending surfaces 118 and 120 extend perpendicular to the inner and outer surfaces 110 and 112 of the powdered metal bushing 108. The first radially extending surface 118 is annular and extends radially inwardly from the outer surface 112 a distance of approximately eighty percent of the distance between the inner and outer surfaces 110 and 112. The second radially extending surface 120 extends radially outwardly from the inner surface 110 approximately twenty percent of the distance between the inner and outer surfaces 110 and 112. The axially extending surface 122 extends perpendicular to the first and second radially extending surfaces 118 and 120 and connects the first radially extending surface to the second radially extending surface. The second radially extending surface 120 and the axially extending surface 122 collectively define a first pocket 124 of the powdered metal bushing 108.

The lower surface 116 of the powdered metal bushing 108 also includes first and second radially extending surfaces 126 and 128, respectively, and an axially extending surface 130. The first and second radially extending surfaces 126 and 128 extend perpendicular to the inner and outer surfaces 110 and 112. The first radially extending surface 126 is annular and extends radially inwardly from the outer surface 112 a distance of approximately eighty percent of the distance between the inner and outer surfaces 110 and 112. The second radially extending surface 128 extends radially outwardly from the inner surface 110 approximately twenty percent of the distance between the inner and outer surfaces 110 and 112. The axially extending surface 130 extends perpendicular to the first and second radially extending surfaces 126 and 128 and connects the first radially extending surface to the second radially extending surface. The second radially extending surface 128 and the axially extending surface 130 collectively define a second pocket 132 of the powdered metal bushing 108.

A plurality of holes 134 extends through the powdered metal bushing 108. In the embodiment illustrated in FIG. 4, six holes 134 extend in an axial direction through the powdered metal bushing 108 from the upper surface 114 to the lower surface 116. Each hole 134 includes a first opening 136 on the first radially extending surface 118 of the upper surface 114 and a second opening 138 on the first radially extending surface 126 of the lower surface 116. The holes 134 are spaced an equidistance from a central axis and are equally spaced around the circumference of the powdered metal bushing 108.

Figure 1A:
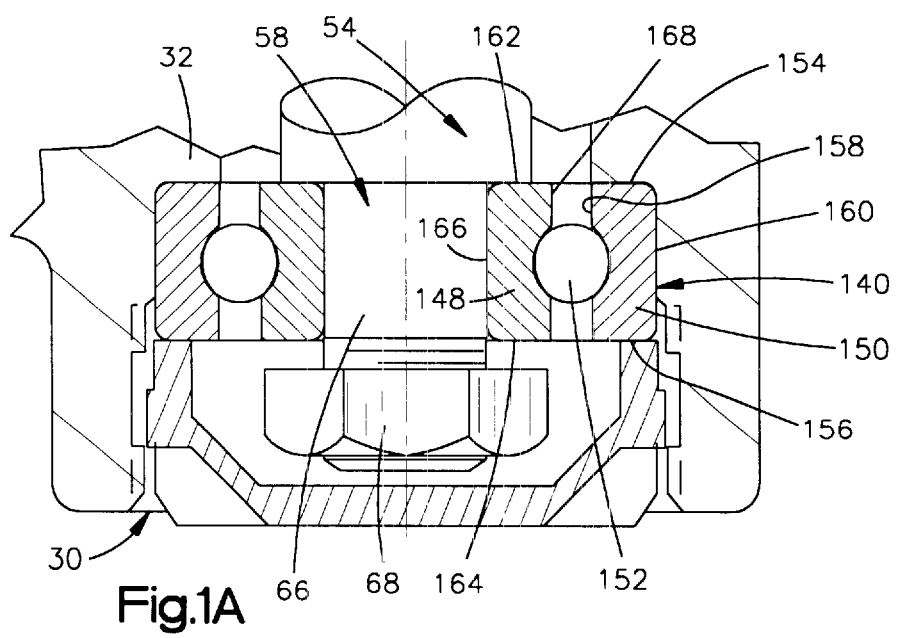
FIG. 1A is an enlarged view of a portion of FIG. 1.

The rack and pinion steering gear 10 also includes a bearing 140, first and second snap rings 142 and 144, respectively, and a fluid-tight seal 146. As best shown in FIG. 1A, the bearing 140 includes inner and outer races 148 and 150, respectively, and a plurality of balls 152 that are interposed between the inner and outer races. The outer race 150 includes first and second end surfaces 154 and 156, respectively, and inner and outer surfaces 158 and 160, respectively. The outer surface 160 of the outer race 150 defines an outer diameter of the bearing 140. The inner surface 158 partially supports the plurality of balls 152. The inner race 148 also includes first and second end surfaces 162 and 164, respectively, and inner and outer surfaces 166 and 168, respectively. The outer surface 168 of the inner race 148 partially supports the plurality of balls 152. The inner surface 166 of the inner race 148 defines an inner diameter of the bearing 140.

The first and second snap rings 142 and 144 are annular rings, each with an opening (not shown) for enabling the expansion and contraction of the respective ring. As shown in FIG. 2, the first snap ring 142 has a rectangular cross-section that includes upper and lower surfaces 170 and 172, respectively, and inner and outer surfaces 174 and 176, respectively. The inner surface 174 defines an inner diameter of the first snap ring 142 and the outer surface 176 defines an outer diameter. The second snap ring 144 has a rectangular cross-section that also includes upper and lower surfaces 178 and 180, respectively, and inner and outer surfaces 182 and 184, respectively. The inner surface 182 of the second snap ring 144 defines an inner diameter of the second snap ring and the outer surface 184 defines an outer diameter. The inner diameter of the second snap ring 144 is larger than the outer diameter of the first snap ring 142.

As best shown in FIG. 2, the fluid-tight seal 146 includes a main body portion 186 having a rigid, non-compressible, annular support structure 188. The support structure 188 has an L-shaped cross-section. Upper and lower sealing portions 190 and 192, respectively, extend axially outwardly from the main body portion 186. The upper sealing portion 190 is frustoconical and narrows, i.e., extends radially inwardly, as it extends away from the main body portion 186. The lower sealing portion 192 is generally cylindrical and includes an annular spring 194 for biasing a sealing surface of the lower sealing portion 192 in a radially inward direction.

The rack and pinion steering gear 10 also includes a yoke assembly 196 (FIGS. 1 and 3). The yoke assembly 196 includes a yoke bearing 198, a spring 200, and a yoke plug 202. The yoke bearing 198 includes a low friction surface for contacting the rack bar 42.

To assemble the directional control valve 70 of the rack and pinion steering gear 10, the splined second axial end of the torsion bar 106 is inserted into the cavity 64 in the first axial end of the first support portion 56 of the pinion assembly 52 to fix rotationally the second axial end of the torsion bar 106 and the pinion assembly 52. The hole in the first axial end of the first support portion 56 of the pinion assembly 52 is aligned with the hole 84 in the second axial end 82 of the valve sleeve 72. A pin 204 is inserted through the holes to fix the valve sleeve 72 to the pinion assembly 52. The first axial end of the torsion bar 106 is received in the valve core 74 of the input shaft 86 and the input shaft is moved relative to the valve sleeve 72 until the valve core is properly positioned in the valve sleeve. The first axial end of the torsion bar 106 is then fixed to the input shaft 86.

The torsion bar 106 supports the valve core 74 relative to the valve sleeve 72. The torsion bar 106 allows the relative rotation of the valve sleeve 72 and the valve core 74 and ensures that the valve core remains coaxial with the valve sleeve.

The first snap ring 142 is then expanded and inserted into the groove 104 in the second cylindrical portion 92 of the input shaft 86. When seated in the groove 104, the inner surface 174 of the first snap ring 142 contacts a bottom of the groove and the outer surface 176 of the first snap ring extends radially outwardly of the outer surface 102 of the second cylindrical portion 92 of the input shaft 86, as best shown in FIG. 2. The resiliency of the first snap ring 142 ensures proper seating of the first snap ring in the groove 104. The assembled directional control valve 70, including the input shaft 86, the torsion bar 106, and the pinion assembly 52, is hereinafter referred to as the valve assembly.

To assemble the rack and pinion steering gear 10, the rack bar 42 is extending through the housing 12. The valve assembly is inserted into the first opening 26 in the first tubular portion 14 of the housing 12 and is moved through the passage 24 toward the second opening 30 until teeth 60 of the pinion gear 54 are placed in meshing engagement with teeth of the rack bar 42. The bearing 140 is then inserted into the second opening 30 of the first tubular portion 14 of the housing 12 and pressed between the housing 12 and the second support portion 58 of the pinion assembly 52. When pressed against the housing 12, the first end 154 of the outer race 150 of the bearing 140 rests against the radially inwardly extending, annular wall 32 and the first end 162 of the inner race 148 rests against a second axial end of the pinion gear 54 of the pinion assembly 52. The pinion nut 68 is then screwed onto the threaded outer surface 66 of the second support portion 58 until the pinion nut is pressed against second end 164 of the inner race 148 of the bearing 140.

Next, the powdered metal bushing 108 is inserted into the first opening 26 of the first tubular portion 14 of the housing 12 and is pressed between the housing and the input shaft 86.

When pressed into the housing 12, the powdered metal bushing 108 is located a short distance away from the first snap ring 142 toward the first axial end 96 of the input shaft 86. An interference fit is formed between an outer surface 112 of the powdered metal bushing 108 and the inner surface 20 of the housing 12. Since the inner diameter of the powdered metal bushing 108 is slightly larger than the outer surface 102 of the second cylindrical portion 92 of the input shaft 86, a loose fit is formed between the inner surface 110 of the powdered metal bushing 108 and the outer surface of the second cylindrical portion of the input shaft.

The fluid-tight seal 146 is then inserted into the first opening 26 of the first tubular portion 14 of the housing 12 and between the inner surface 20 of the housing 12 and the input shaft 86. The main body portion 186 of the seal 146 contacts the inner surface 20 of the housing 12 and the upper and lower sealing portions 190 and 192 of the seal 146 contact the input shaft 86. The lower sealing portion 192 is biased against the outer surface 102 of the second cylindrical portion 92 of the input shaft 86. An inner surface of the upper sealing portion 190 makes line contact with the tapered portion 94 of the input shaft 86.

The second snap ring 144 is then inserted into the groove 28 on the inner surface 20 of the first tubular portion 14 of the housing 12 to secure the powdered metal bushing 108 and the fluid-tight seal 146 in the housing 12. The second snap ring 144 is compressed and inserted into the first opening 26. The resiliency of the second snap ring 144 seats the second snap ring into the groove 28 such that an outer diameter of the second snap ring contacts the bottom of the groove. The inner surface 182 of the second snap ring 144 extends radially outwardly from the inner surface 20 of the first tubular portion 14 of the housing 12. The input shaft 86 is now ready to be connected to the steering wheel of the vehicle.

The yoke assembly 196 is then inserted into the yoke bore 40. The yoke bearing 198 of the yoke assembly 196 contacts the rack bar 42 on a side opposite the pinion gear 54. The yoke assembly 196 applies a force against the rack bar 42 to maintain a proper lash between the teeth of the rack bar and the helical teeth 60 of the pinion gear 54.

During operation of the rack and pinion steering gear 10, the input shaft 86 is rotated as the vehicle steering wheel is rotated. If the resistance to turning of the steerable wheels is below a predetermined value, rotation of the input shaft 86 will rotate the pinion gear 54 and will move the rack bar 42 to turn the steerable wheels. If the resistance to turning of the steerable wheels is above the predetermined value, the pinion gear 54 will not rotate with the rotation of the input shaft 86. As a result, the torsion bar 106 will twist and the valve core 74 will move relative to the valve sleeve 72. The directional control valve 70 will direct fluid to one of the chambers 48 and 50 of the hydraulic motor 44. As a result, the hydraulic motor 44 assists in moving the rack bar 42 to turn the steerable wheels. As the rack bar 42 moves, the pinion gear 54 rotates and the twisting, or torsion, is removed from the torsion bar 106.

When the pressure of one chamber 48 or 50 of the hydraulic motor 44 increases relative to the other chamber 50 or 48, the piston 46 moves until the pressures within the chambers again equalize. During the movement of the piston 46, the lower pressure chamber decreases in volume. As a result, hydraulic fluid is forced from the chamber. The hydraulic fluid returns to the directional control valve 70 and is then directed to a chamber 206 within the first tubular portion 14 of the housing prior 12 to being returned to the reservoir 80.

The chamber 206 in the first tubular portion 14 of the housing 12 is located adjacent the second cylindrical portion 92 of the input shaft 86 and is bordered on an upper side, as viewed in FIGS. 1 and 3, by an assembly formed from the first and second snap rings 142 and 144, the powdered metal bushing 108, and the fluid-tight seal 146. During operation of the rack and pinion steering gear 10, the fluid in the chamber 206 is under pressure and the pressure forces the fluid into the conduit leading to the reservoir 78. The plurality of holes 134 in the powdered metal bushing 108 allows fluid to pass through the powdered metal bushing to the fluid-tight seal 146. Thus, the powdered metal bushing 108 does not act as a seal to prevent fluid leakage from the first opening 26 of the first tubular portion 14 of the housing 12. Additionally, since fluid may pass through the holes 134 of the powdered metal bushing 108, fluid pressure across the powdered metal bushing is equalized and does not tend to force the powdered metal bushing toward the first opening 26 of the first tubular portion 14 of the housing 12.

Interaction of the helical teeth 60 of the pinion gear 54 and the teeth of the rack bar 42 during rotation of the pinion gear results in a longitudinal force, i.e., into and out of the plane of the paper, for moving the rack bar and an axial force that is directed along axis A. The axial force tends to move the valve assembly in an axial direction relative to the first tubular portion 14 of the housing 12 and relative to the rack bar 42. The direction of the axial force is dependent upon the slope of the helical teeth 60 on the pinion gear 54. In the rack and pinion steering gears shown in FIGS. 1 and 3, rotation of the pinion gear 54 in the counterclockwise direction, shown by the arrow R in FIG. 3, results in an axial force that is directed toward a first axial end of the first tubular portion 14 of the housing 12, shown at arrow F in FIG. 3.

When the pinion nut 68 is tightened against the second end 164 of the inner race 148 of the bearing 140, the axial force in the direction F is resisted by engagement of the pinion nut with the second end of the inner race of the bearing. However, in the event that the pinion nut 68 is not tightened against the second end 164 of the inner race 148 of the bearing 140, as is illustrated in FIGS. 1 and 1A, the axial force in the direction F is resisted by engagement of the first snap ring 142 with the lower surface 116 of the powdered metal bushing 108. The axial force in the direction F causes the valve assembly to move slightly toward the first opening 26. During this movement, the first snap ring 142 moves into the second pocket 132 of the powdered metal bushing 108 and engages the second radially extending surface 128 of the lower surface 116 of the powdered metal bushing 108. When the first snap ring 142 is received in the second pocket 132, the axially extending surface 130 of the lower surface 116 of the powdered metal bushing 108 resists any radial movement of the input shaft 86. Additionally, the axially extending surface 130 of the lower surface 116 of the powered metal bushing 108 will not radially expand or unravel the first snap ring 142.

FIGS. 1 and 2 illustrate the position of the first snap ring 142 relative to the powdered metal bushing 108 prior to any axial movement of the valve assembly. FIG. 3 illustrates the engagement of the first snap ring 142 and the powdered metal bushing 108.

The second snap ring 144 helps to resist any axial movement of the powdered metal bushing 108 toward the first opening 26 as a result of the axial force. Any potential axial movement of the powdered metal bushing 108 is resisted by the non-compressibility of the support structure 188 of the fluid-tight seal 146 and the second snap ring 144.

When the axial force is removed, the valve assembly moves back to the position shown in FIG. 1. When the input shaft 86 is turned clockwise, an axial force directed toward the second opening 30 of the first tubular portion 14 of the housing 12 is resisted by engagement of the second axial end of the pinion gear 54 with the first end 162 of the inner race 148 of the bearing 140.

From the above description of the invention, those skilled in the art will perceive improvements, changes and modifications. Such improvements, changes and modifications within the skill of the art are intended to be covered by the appended claims.

Having described the invention, the following is claimed:

1. A rack and pinion steering apparatus for turning steerable wheels of a vehicle in response to rotation of a steering wheel, the apparatus comprising:

a housing;

a rack bar extending through the housing and movable relative to the housing for turning the steerable wheels of the vehicle, the rack bar having a plurality of teeth;

a pinion gear located within the housing and being rotatable relative to the housing, the pinion gear including a plurality of helical teeth that meshingly engage teeth of the rack bar, engagement of the helical teeth of the pinion gear with the teeth of the rack bar during rotation of the pinion gear in a first direction resulting in an axial force acting on the pinion gear;

a shaft connectable with the steering wheel of the vehicle and being rotatable relative to the housing, at least a portion of the shaft extending into the housing and connecting with the pinion gear, rotation of the shaft effecting rotation of the pinion gear; and an assembly interposed between the shaft and the housing, the assembly comprising a first snap ring that is attached to the portion of the shaft extending into the housing and a second snap ring that is attached to the housing, interposed between the first and second snap rings are only a fluid tight seal for blocking fluid leakage from the housing and a bushing for enabling rotation of the shaft relative to the housing, the bushing including a radially extending surface for engaging the first snap ring to block axial displacement of the pinion gear due to the axial force acting on the pinion gear, wherein the bushing is formed from powered metal, and a percentage of iron in the powdered metal ranges from 91.1% to 95.4%, a percentage of copper in the powdered metal ranges from 4.0% to 0.9%, and a percentage of carbon in the powdered metal ranges from 0.6% to 0.9%.

2. A rack and pinion steering apparatus for turning steerable wheels of a vehicle in response to rotation of a steering wheel, the apparatus comprising:

a housing;

a rack bar extending through the housing and movable relative to the housing for turning the steerable wheels of the vehicle, the rack bar having a plurality of teeth;

a pinion gear located within the housing and being rotatable relative to the housing, the pinion gear including a plurality of helical teeth that meshingly engage teeth of the rack bar, engagement of the helical teeth of the pinion gear with the teeth of the rack bar during rotation of the pinion gear in a first direction resulting in an axial force acting on the pinion gear;

a shaft connectable with the steering wheel of the vehicle and being rotatable relative to the housing, at least a portion of the shaft extending into the housing and connecting with the pinion gear, rotation of the shaft effecting rotation of the pinion gear; and an assembly interposed between the shaft and the housing, the assembly comprising a first snap ring that is attached to the portion of the shaft extending into the housing and a second snap ring that is attached to the housing, interposed between the first and second snap rings are only a fluid tight seal for blocking fluid leakage from the housing and a bushing for enabling rotation of the shaft relative to the housing, the bushing including a radially extending surface for engaging the first snap ring to block axial displacement of the pinion gear due to the axial force acting on the pinion gear, wherein the bushing includes a plurality of axially extending holes for allowing fluid flow through the bushing.

3. The rack and pinion steering apparatus as defined in claim 2 wherein the seal includes a non-compressible support structure, the seal and the second snap ring preventing axial movement of the bushing.

4. A rack and pinion steering apparatus for turning steerable wheels of a vehicle in response to rotation of a steering wheel, the apparatus comprising:

a housing;

a rack bar extending through the housing and movable relative to the housing for turning the steerable wheels of the vehicle, the rack bar having a plurality of teeth;

a pinion gear located within the housing and being rotatable relative to the housing, the pinion gear including a plurality of helical teeth that meshingly engage teeth of the rack bar, engagement of the helical teeth of the pinion gear with the teeth of the rack bar during rotation of the pinion gear in a first direction resulting in an axial force acting on the pinion gear;

a shaft connectable with the steering wheel of the vehicle and being rotatable relative to the housing, at least a portion of the shaft extending into the housing and connecting with the pinion gear, rotation of the shaft effecting rotation of the pinion gear; and an assembly interposed between the shaft and the housing, the assembly comprising a first snap ring that is attached to the portion of the shaft extending into the housing and a second snap ring that is attached to the housing, interposed between the first and second snap rings are only a fluid tight seal for blocking fluid leakage from the housing and a bushing for enabling rotation of the shaft relative to the housing, the bushing including a radially extending surface for engaging the first snap ring to block axial displacement of the pinion gear due to the axial force acting on the pinion gear, wherein the bushing includes a pocket for receiving the first snap ring, the pocket being partially defined by the radially extending surface.

5. The rack and pinion steering apparatus as defined in claim 4 wherein the pocket is also partially defined by an axially extending surface of the bushing, the axially extending surface preventing radial movement of the shaft relative to the housing when the first snap ring is located in the pocket.

6. The rack and pinion steering apparatus as defined in claim 5 wherein the axially extending surface of the pocket prevents unraveling of the first snap ring when the first snap ring is located in the pocket.

7. A rack and pinion steering apparatus for turning steerable wheels of a vehicle in response to rotation of a steering wheel, the apparatus comprising:

a housing;

a rack bar extending through the housing and movable relative to the housing for turning the steerable wheels of the vehicle, the rack bar having a plurality of teeth;

a pinion gear located within the housing and being rotatable relative to the housing, the pinion gear including a plurality of helical teeth that meshingly engage teeth of the rack bar, engagement of the helical teeth of the pinion gear with the teeth of the rack bar during rotation of the pinion gear in a first direction resulting in an axial force acting on the pinion gear;

a shaft connectable with the steering wheel of the vehicle and being rotatable relative to the housing, at least a portion of the shaft extending into the housing and connecting with the pinion gear, rotation of the shaft effecting rotation of the pinion gear; and an assembly interposed between the shaft and the housing, the assembly comprising a first snap ring that is attached to the portion of the shaft extending into the housing and a second snap ring that is attached to the housing, interposed between the first and second snap rings are only a fluid tight seal for blocking fluid leakage from the housing and a bushing for enabling rotation of the shaft relative to the housing, the bushing being a unitary structure having an annular outer surface for engaging the housing and an annular inner surface for engaging the portion of the shaft extending into the housing, the annular inner surface of the bushing being fixed relative to and being coaxial with the annular outer surface of the bushing, the bushing further including a radially extending surface for engaging the first snap ring to block axial displacement of the pinion gear due to the axial force acting on the pinion gear, wherein the bushing is formed from powdered metal and is self-lubricating.

8. The rack and pinion steering apparatus as defined in claim 7 wherein the powdered metal includes iron, copper, and carbon.

* * * * *